(12) United States Patent
Sanchez

(10) Patent No.: US 7,808,563 B2
(45) Date of Patent: Oct. 5, 2010

(54) FLAT PANEL TV SCREEN FRAME SYSTEM

(76) Inventor: Steve Sanchez, 108 Cara Ct., Walnut Creek, CA (US) 94596

( * ) Notice: Subject to any disclaimer, the term of this patent is extended or adjusted under 35 U.S.C. 154(b) by 994 days.

(21) Appl. No.: 10/800,896

(22) Filed: Mar. 15, 2004

(65) Prior Publication Data

US 2005/0200765 A1    Sep. 15, 2005

(51) Int. Cl.
*H04N 5/65* (2006.01)
(52) U.S. Cl. .................................................. 348/818
(58) Field of Classification Search ................ 348/794, 348/839–841, 844, 818, 842; 381/306, 681; 312/223.6; 40/514, 515, 799; 160/121.1
See application file for complete search history.

(56) References Cited

U.S. PATENT DOCUMENTS

| | | | |
|---|---|---|---|
| 3,294,905 A | 12/1966 | Jonassen | |
| 4,002,831 A | 1/1977 | Aeschliman | |
| 4,675,755 A | 6/1987 | Baumeister et al. | |
| 4,998,283 A * | 3/1991 | Nishida et al. | 381/388 |
| 5,264,765 A * | 11/1993 | Pecorino et al. | 318/265 |
| 5,328,145 A * | 7/1994 | Charapich | 248/442.2 |
| 5,343,257 A * | 8/1994 | Kohno et al. | 348/842 |
| 5,526,066 A * | 6/1996 | Kikuchi | 348/841 |
| 5,543,925 A | 8/1996 | Timmermans | |
| 5,564,209 A | 10/1996 | Zagnoli | |
| 5,638,096 A | 6/1997 | Schwartz | |
| D392,682 S | 3/1998 | Johnston et al. | |
| 5,810,461 A * | 9/1998 | Ive et al. | 312/223.6 |
| 6,266,069 B1 | 7/2001 | Thagard et al. | |
| D473,877 S | 4/2003 | Korpai | |
| 6,543,167 B1 | 4/2003 | Dwyer | |
| 6,550,172 B2 | 4/2003 | Korpai | |
| 6,678,152 B2 * | 1/2004 | Kim | 361/681 |
| 6,817,128 B2 * | 11/2004 | Korpai | 40/725 |
| 6,826,859 B1 * | 12/2004 | Lin | 40/514 |
| 6,901,987 B1 * | 6/2005 | Graham | 160/121.1 |
| 2001/0033344 A1 * | 10/2001 | Grein et al. | 348/794 |
| 2003/0093445 A1 | 5/2003 | Schick et al. | |
| 2003/0223609 A1 * | 12/2003 | Anderson et al. | 381/333 |
| 2004/0064986 A1 * | 4/2004 | Anderson | 40/515 |
| 2004/0150943 A1 * | 8/2004 | Rock | 361/681 |
| 2005/0031144 A1 * | 2/2005 | Mizuno et al. | 381/306 |
| 2005/0047616 A1 * | 3/2005 | Lee | 381/152 |
| 2005/0047617 A1 * | 3/2005 | Lee | 381/306 |
| 2006/0000135 A1 * | 1/2006 | Yoon | 40/799 |

* cited by examiner

*Primary Examiner*—Tung Vo
(74) *Attorney, Agent, or Firm*—Thomas R. Lampe

(57) ABSTRACT

A frame is attached to a wall mountable flat panel TV screen by connector structure. The frame enhances the appearance of the flat panel TV screen. An electronic component receptacle is connectable to the frame to hold modular electronic components employed in association with the flat panel TV screen.

12 Claims, 10 Drawing Sheets

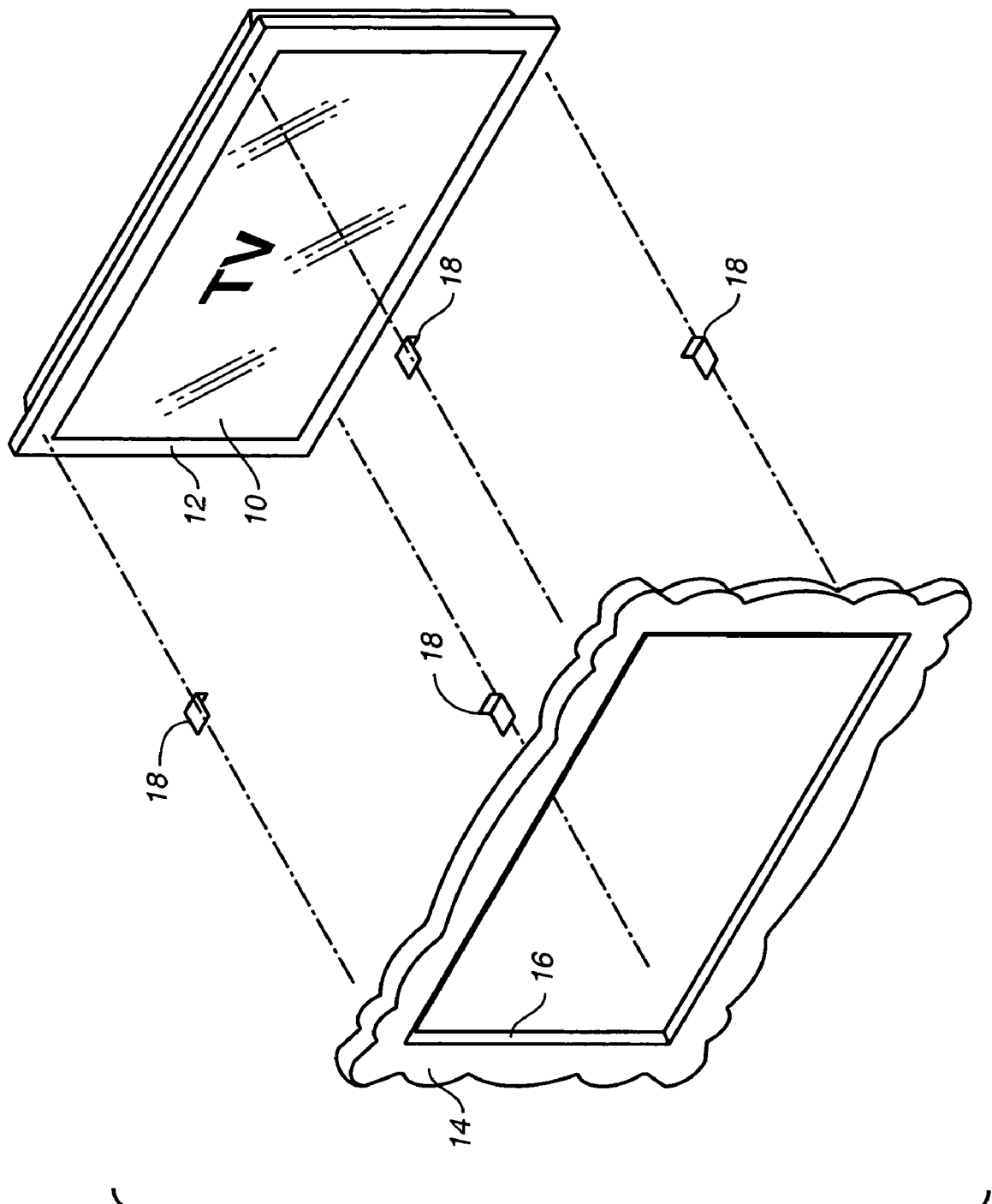
FIG._1

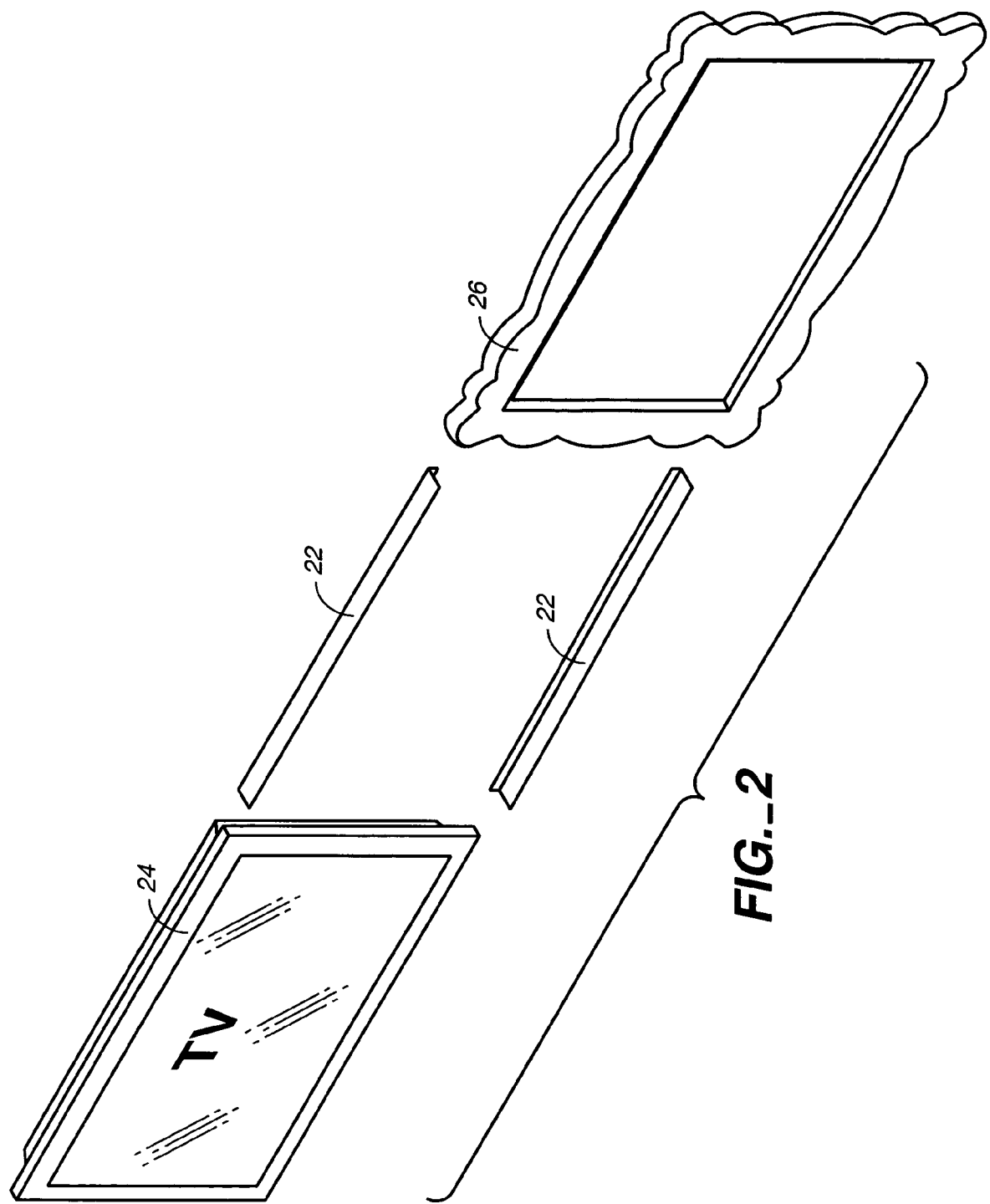

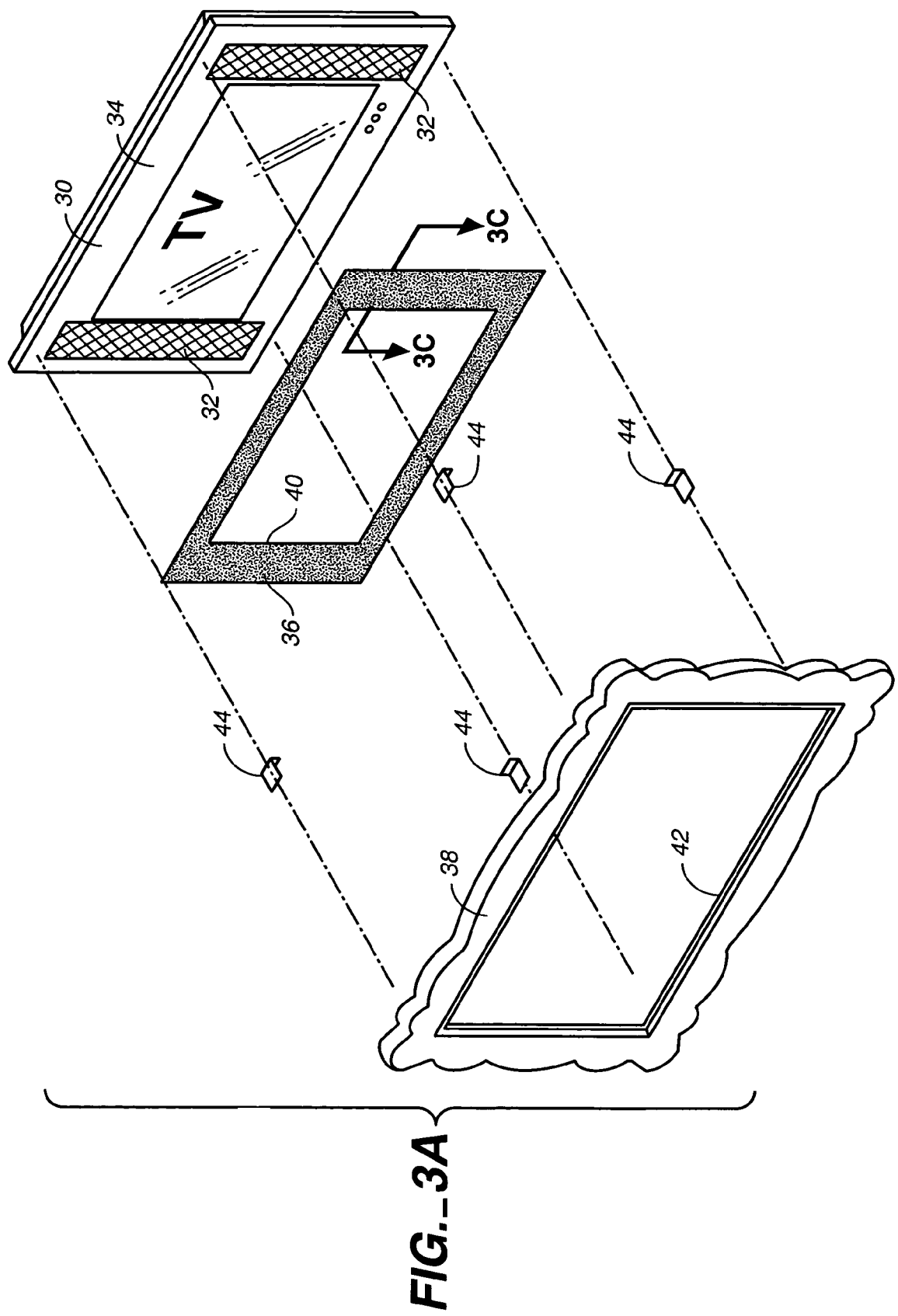
FIG._3A

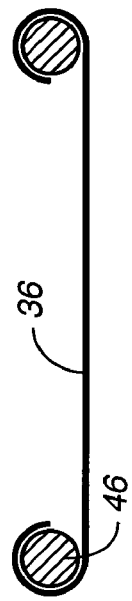
FIG._3C
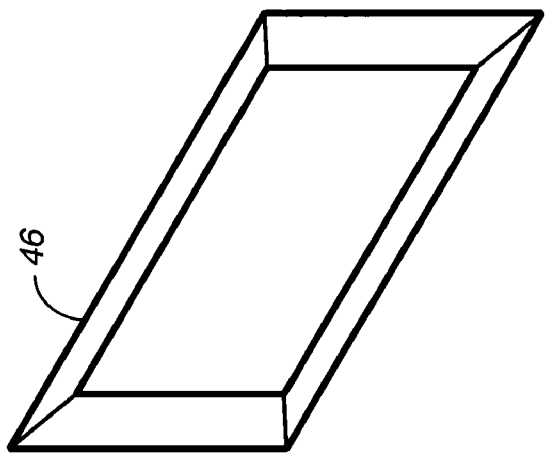
FIG._3D
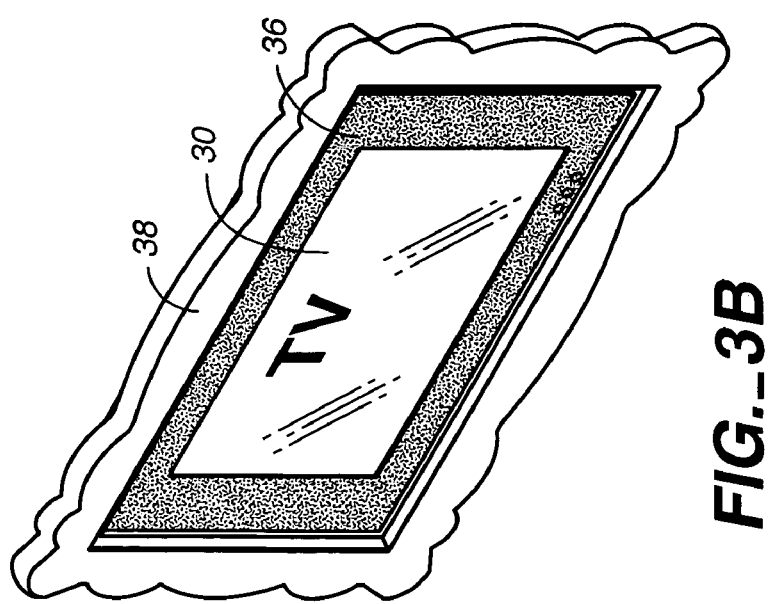
FIG._3B

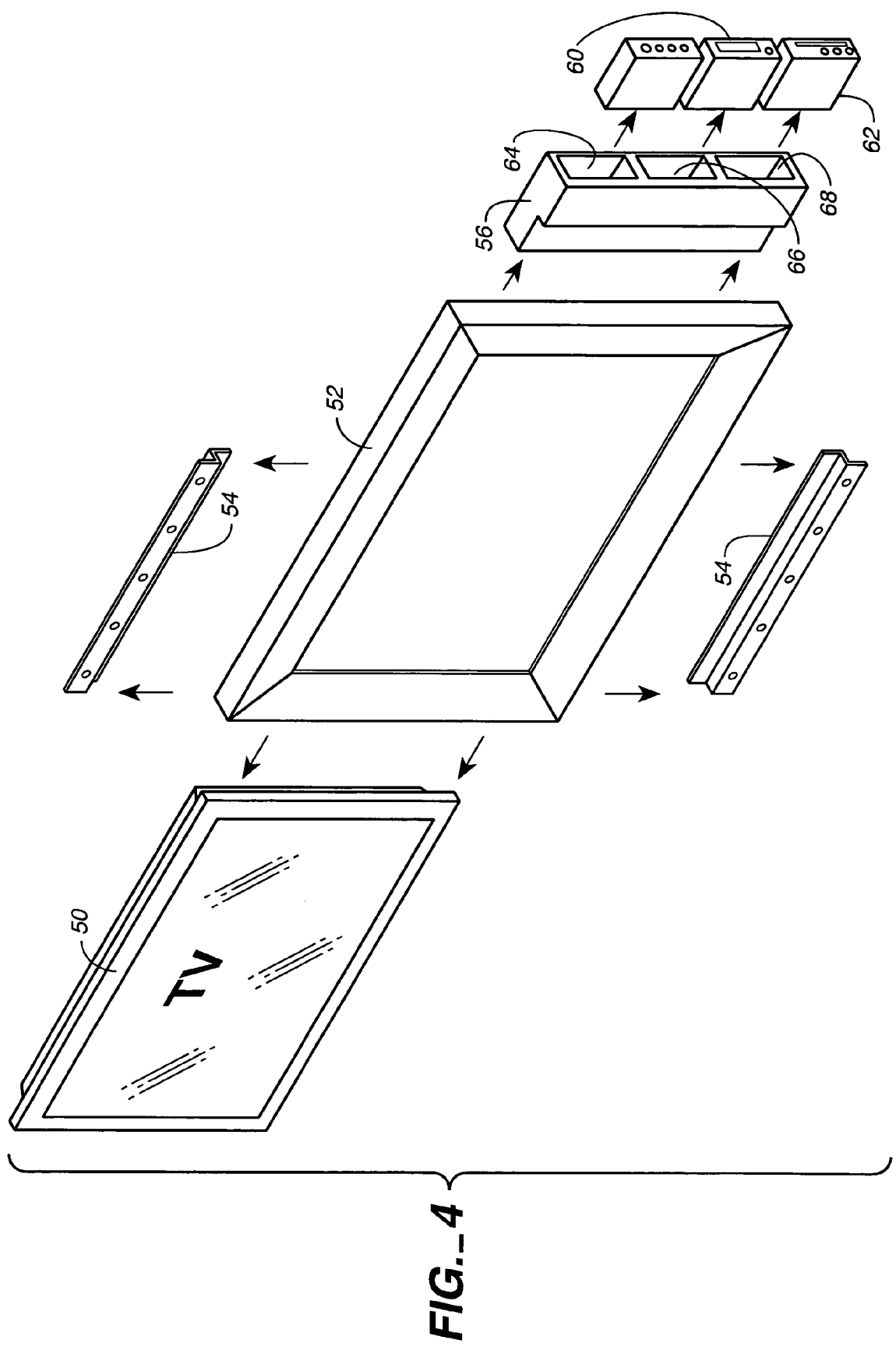
FIG._4

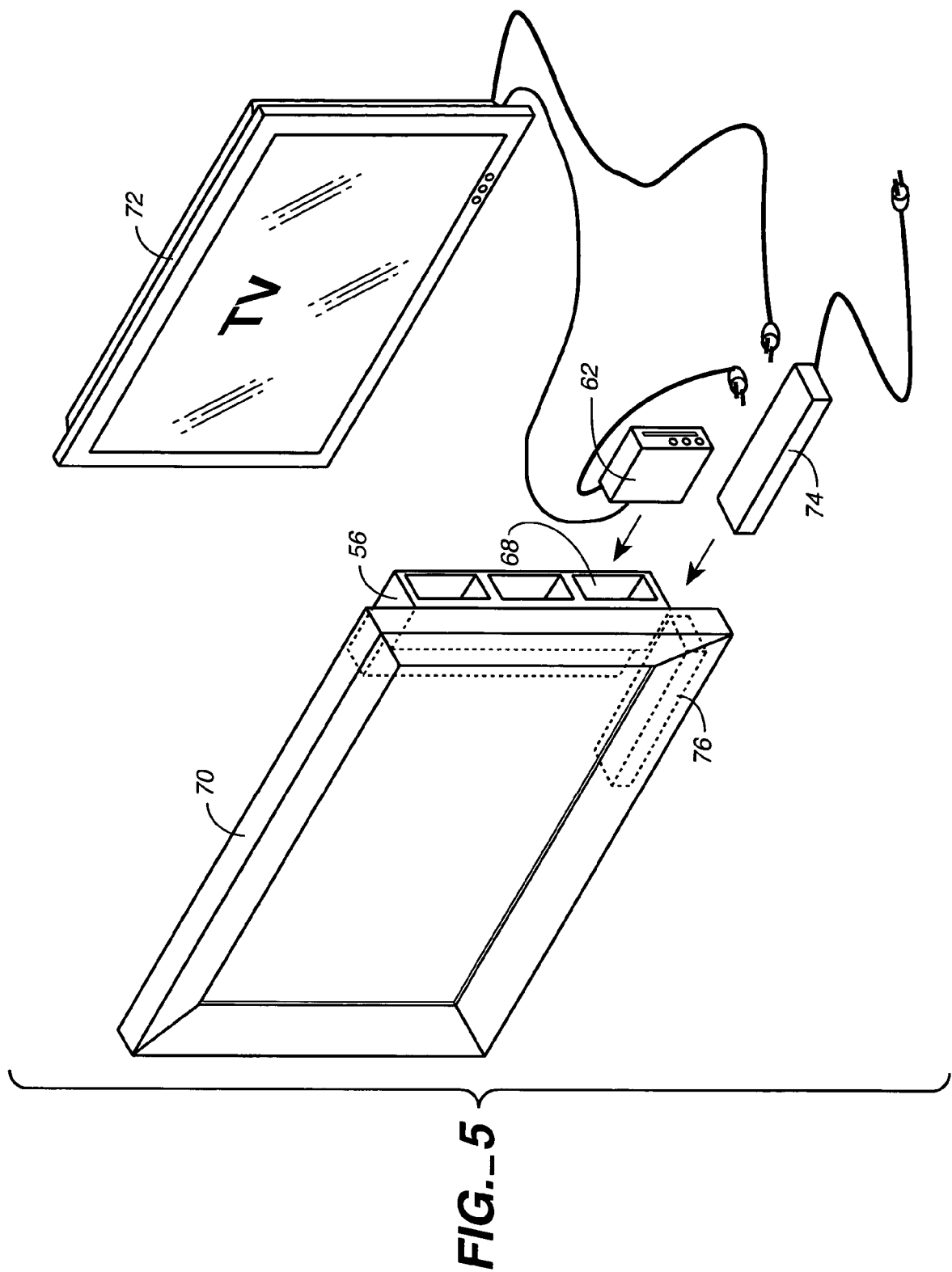
FIG._5

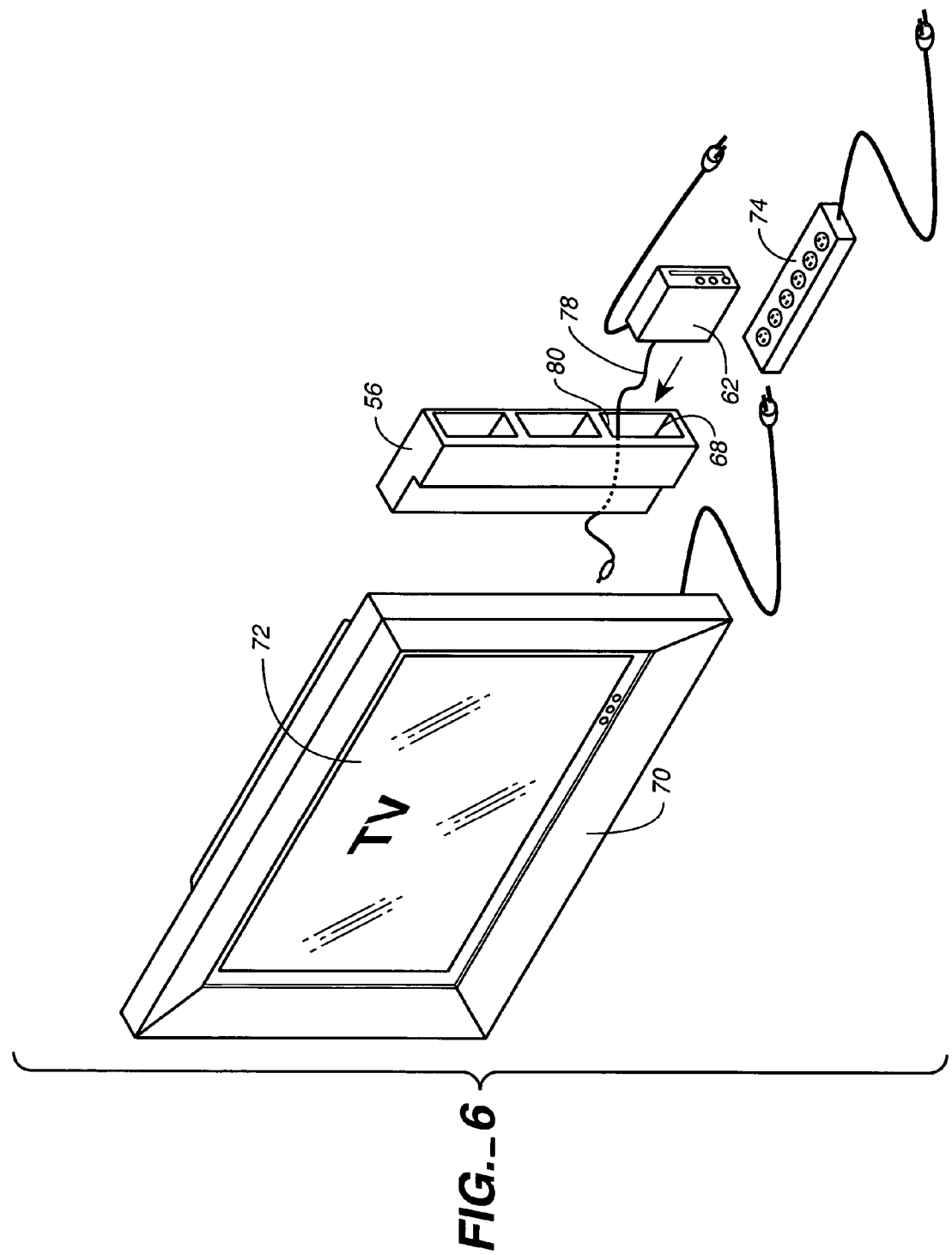

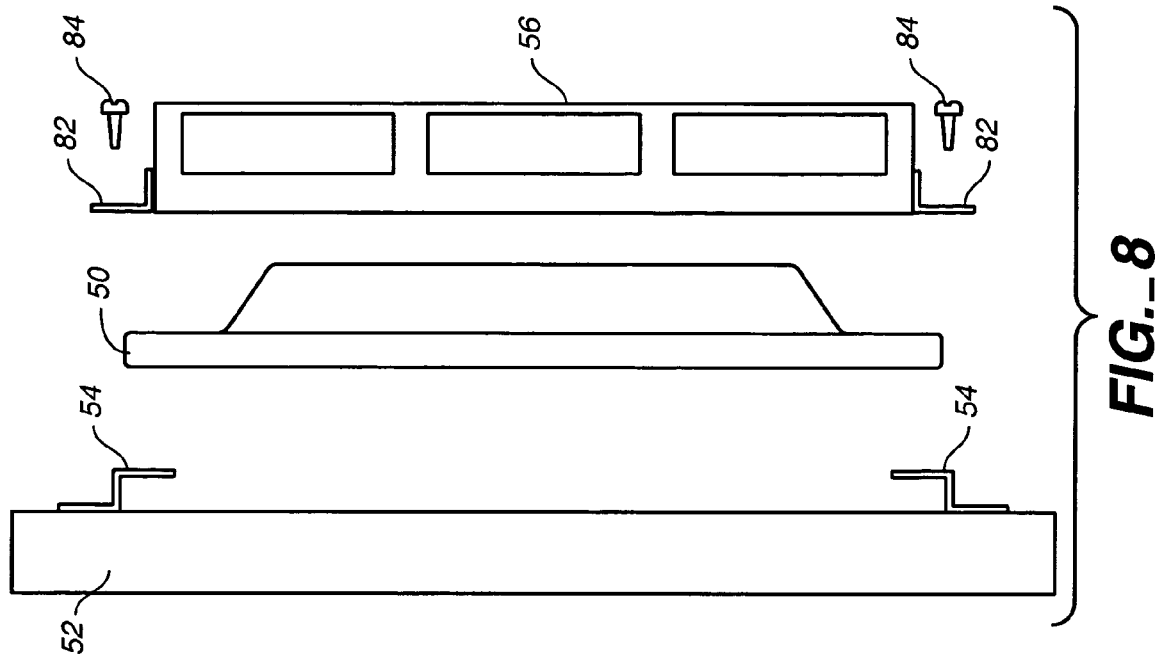
FIG._8
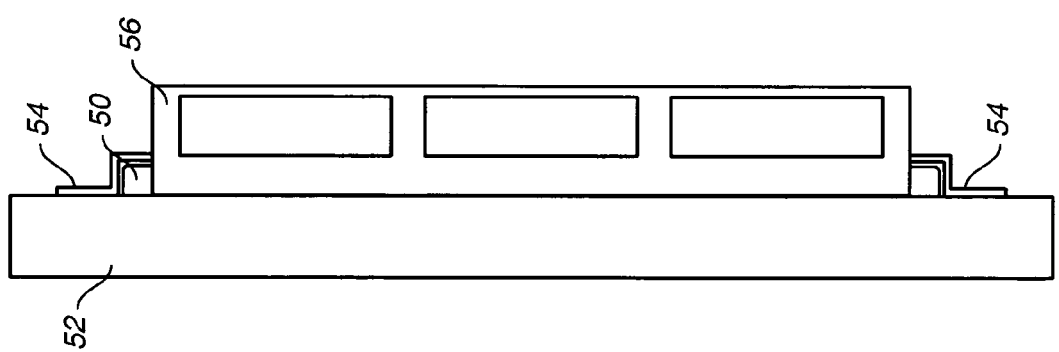
FIG._7

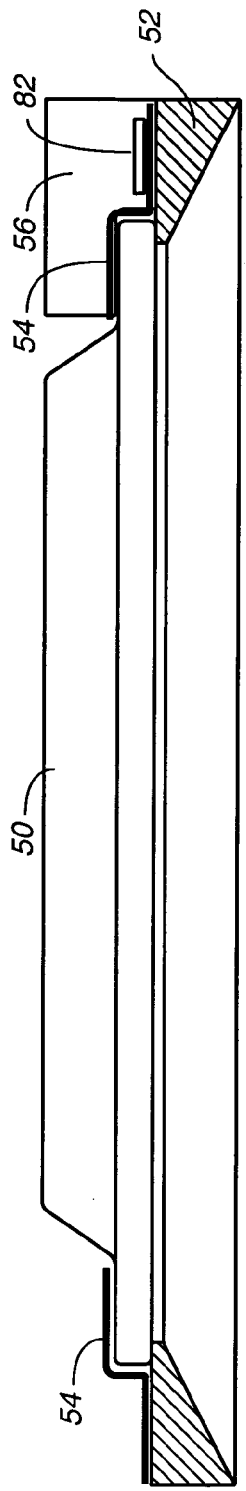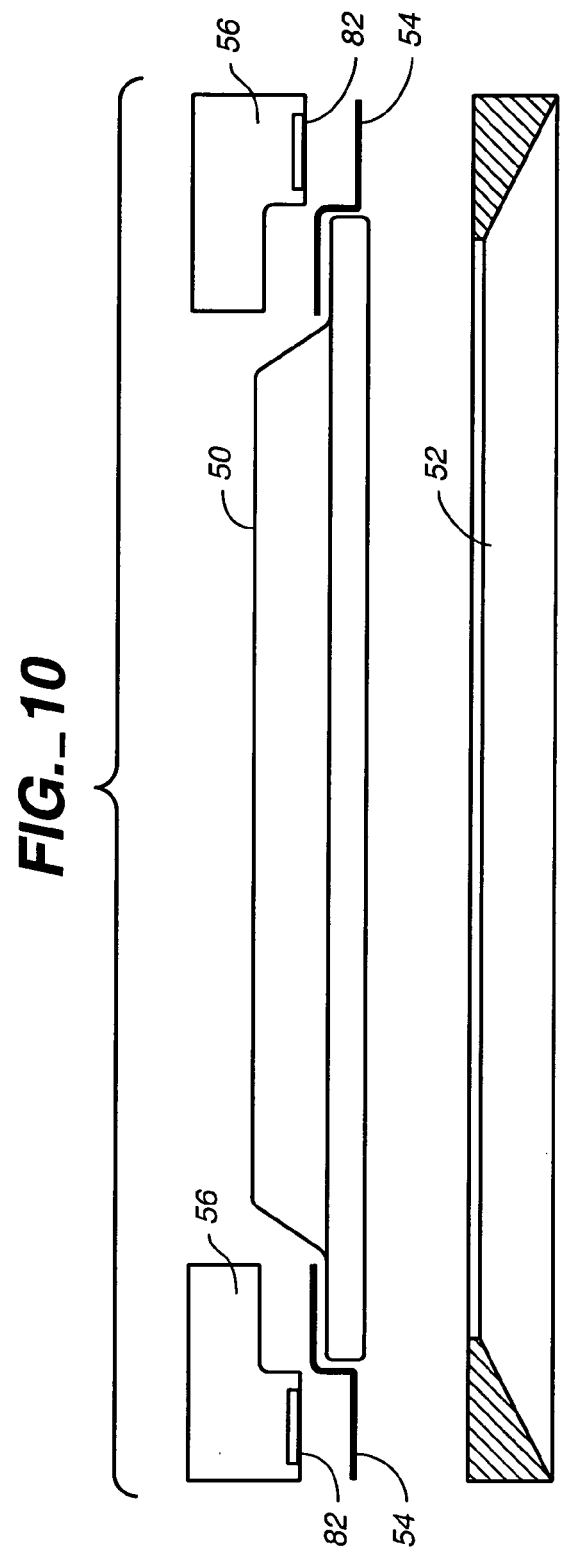

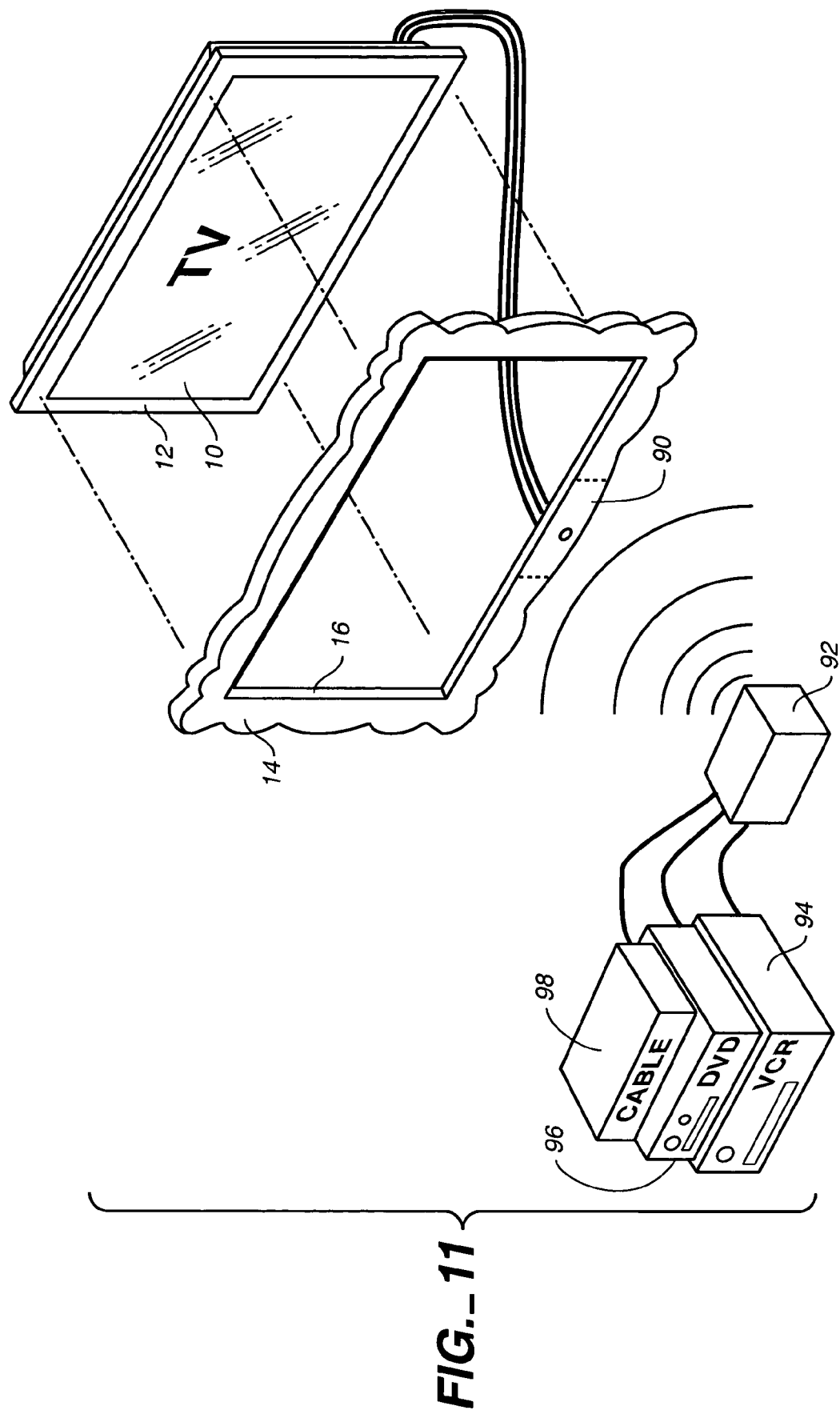

FLAT PANEL TV SCREEN FRAME SYSTEM

TECHNICAL FIELD

This invention relates to wall mountable flat panel TV screens, such as plasma and LCD screens or display monitors, and to structure associated therewith to frame the screen with the option to facilitate use of interchangeable electronic module components with the screen and/or provide wireless connection to remote devices.

BACKGROUND OF THE INVENTION

Flat panel TV screens, such as plasma and LCD screens, are becoming increasingly popular and affordable. Such screens are often mounted on a room wall. This can result in a somewhat less than aesthetic appearance. Also, electronic equipment employed in association with the screen can present its own problems. Not only is such equipment exposed to view, it often is located at a location or locations remote from the screen itself. Separate cabinetry can be utilized to accommodate the equipment; however, this can be inconvenient as well as relatively expensive. Then too, wires and electrical interconnections between such equipment and the screen present an unsightly appearance.

As will be seen below, the system of the present invention incorporates a frame which not only improves the appearance of the flat panel TV screen but also can be utilized to hold electronic modular equipment associated with the screen and maintain such equipment essentially hidden from view. This not only eliminates the need for existing equipment to be right next to or below the TV, but also eliminates from view interconnecting wiring.

According to one embodiment of the invention, the frame can accommodate a wireless receiver to transfer information from remote devices to the TV with which the frame is associated.

A search of the prior art located the following: U.S. Pat. No. 4,002,831, issued Jan. 11, 1977, U.S. Pat. No. 6,266,069, issued Jul. 24, 2001, U.S. Pat. No. 3,294,905, issued Dec. 27, 1966, U.S. Pat. No. 5,564,209, issued Oct. 15, 1996, U.S. Pat. No. 6,550,172, issued Apr. 22, 2003, U.S. Pat. No. 5,638,096, issued Jun. 10, 1997, U.S. Pat. No. 6,543,167, issued Apr. 8, 2003, U.S. Pat. No. 4,675,755, issued Jun. 23, 1987, U.S. Pat. No. 5,543,925, issued Aug. 6, 1996, U.S. Design Pat. No. 473,877, issued Apr. 29, 2003, U.S. Design Pat. No. 392,682, issued Mar. 24, 1998 and Patent Application Publication No. US 2003/0093445.

Although it is known in the prior art to incorporate decorative adornments and cases with standard cathode ray tube television sets and computer monitors, there is no disclosure of a frame in conjunction with flat panel wall mountable TV screens, such as plasma and LCD screens. Furthermore, there is no teaching of the features of applicant's invention as disclosed and claimed herein relating to utilization of frame structure with other system components to hold electronic module equipment to be utilized in association with the flat panel TV screen or as a wireless receiver for external remote components.

DISCLOSURE OF INVENTION

The present invention is directed to a combination incorporating a flat panel TV screen and a frame defining a frame opening.

Connector structure releasably connects the frame to the flat panel TV screen with the frame surrounding the flat panel TV screen and the flat panel TV screen is observable through the frame opening.

The flat panel TV screen includes a housing. The connector structure extends between the housing and the frame.

The combination additionally includes an electronic component receptacle connected to the frame and defining a receptacle interior for receiving at least one modular electronic component selectively operatively associated with the flat panel TV screen.

The frame can have built into it a wireless receiver that receives information from a remote transmitter that connects to existing electronic components, e.g., DVDs, VCRs or computers.

Other features, advantages and objects of the present invention will become apparent with reference to the following description and accompanying drawings.

BRIEF DESCRIPTION OF DRAWINGS

FIG. 1 is an exploded, perspective view illustrating a flat panel TV screen and a frame therefore prior to interconnection of the frame with the flat panel TV screen by brackets;

FIG. 2 is an exploded, perspective view illustrating components of a second embodiment of the invention;

FIG. 3A is a perspective, exploded view of a third embodiment of the invention;

FIG. 3B illustrates the structural components of the embodiment of FIG. 3A in assembled condition;

FIG. 3C is a greatly enlarged, cross-sectional view taken along the line 3C-3C in FIG. 3A;

FIG. 3D is a perspective view of a mat holding frame employed in the embodiment of FIG. 3A;

FIG. 4 is an exploded, perspective view of components of a fourth embodiment of the invention, illustrating an electronic component receptacle and three modular electronic components selectively housed thereby;

FIG. 5 illustrates in schematic fashion an electronic component receptacle attached to a frame of another embodiment of the invention along with one electronic component, prior to insertion of the latter into the receptacle connector structure, and a multi-outlet electrical connector in the form of a power strip prior to positioning of the power strip in an electrical connector receptacle formed in the frame;

FIG. 6 is a perspective view illustrating a flat panel TV screen in position on a frame such as that shown in FIG. 5, but with other components of the system separated from the combined screen/frame;

FIG. 7 is a greatly enlarged, side elevational view of the assembled frame, flat panel TV screen and electronic component receptacle as incorporated in the embodiment of FIG. 5;

FIG. 8 is an enlarged, exploded, side elevational view illustrating an alternative approach to attaching an electrical connector receptacle to a frame;

FIG. 9 is a top plan view of a completed assembly incorporating the components of FIG. 8;

FIG. 10 is an exploded view of an arrangement similar to that shown in FIGS. 8 and 9, but illustrating the use of two electronic receptacles; and FIG. 11 is an exploded view illustrating a frame employed as a receiver to establish a wireless interconnection between a TV and remote electronic components.

MODES FOR CARRYING OUT THE INVENTION

FIG. 1 shows a flat panel TV screen 10 of conventional construction including a housing 12 surrounding the central screen viewing area. A frame 14 is shown prior to application thereof to the screen. The frame 16 may be formed of any suitable material and may have any suitable configuration, the frame defining a frame opening 16. The frame opening is sized to receive the display portion of the screen and allow viewing thereof while covering the housing 12 to present a more pleasing appearance. Connector structure in the form of brackets 18 is utilized to releasably connect the frame 14 to the screen housing.

FIG. 2 shows another embodiment of the invention wherein brackets 22 in the form of elongated rails 22 are utilized to hold a flat panel TV screen 24 and a frame 26 together. The horizontal components of the brackets are secured to the back of the frame by any known expedient such as threaded fasteners (not shown) so that the vertical legs of the brackets extend upwardly and downwardly spaced from the frame, enabling the screen 24 to be slid in position relative to the frame.

FIGS. 3A-3D illustrate another embodiment of the invention. In this arrangement, a flat panel TV screen 30 has loudspeakers 32 in the housing 34 of the screen. The loudspeakers are disposed on opposed sides of the viewing area of the screen. In this instance, the housing incorporates components of the TV of which the screen is a part.

A mat 36 formed of mesh or other sound transmissive material is disposed over the loudspeakers 32 and blocks the loudspeakers from view through the frame opening of frame 38 when the components are assembled. The mat defines a mat opening 40, the flat panel TV screen 30 being observable through the frame opening 42 and mat opening 40. The mat has a rectangular configuration and is sized to present a pleasing appearance and conform to diverse TV manufacturer's specifications while covering the loudspeakers and enabling the viewer to observe the display portion of the screen 30. The mat may be formed of material allowing passage of remote control signals. Conventional available brackets such as brackets 44 may be utilized to secure the assembly components together, such assembled condition being illustrated in FIG. 3B.

As may best be seen with reference to FIGS. 3C and 3D, the mat 36 is stretched and maintained in a planar condition by a rectangular shaped wire frame 46.

In the FIG. 4 embodiment, a flat panel TV screen 50 is operatively associated with a frame 52 and held in position relative thereto by elongated brackets 54. The brackets 54 are secured to the back of frame 52 by threaded fasteners such as screws (not shown) and form a confining rail arrangement engaging the top and bottom of the screen 50 and enabling the screen to be slid in place or slid out of place relative to the frame.

FIG. 4 also shows an electronic component receptacle 56 which is connected to the frame and defines a receptacle interior for receiving three modular electronic components 58, 60, 62. These components may, for example, be such things as DVD players, digital camera card readers, or wireless receivers providing wireless communication with a computer or to a hub/transmitter connected to existing entertainment components.

Electronic component receptacle 56 is for placement behind the frame 52 so that it is essentially hidden from view by a person positioned in front of the flat panel TV screen. The electronic component receptacle is divided into three compartments 64, 66, 68, each defining a compartment interior. The receptacle interior is comprised of these compartment interiors, each compartment interior for receiving a modular electronic component. These components may be replaced or varied depending upon the requirements or desires of the user of the system. More or less than three compartments could be employed.

FIG. 5 shows the electronic component receptacle 56 in place behind frame 70, the flat panel TV screen 72 not yet being installed in place. Modular electronic component 62 is shown prior to its entry into compartment 68. The output lead associated with component 62 leads to flat panel housing screen 72 of the TV while the power cord of component 62 is shown prior to being plugged into a socket of a multi-outlet electrical connector in the form of a power strip 74. Hidden lines at the bottom of the frame 70 depict an electrical connector receptacle 76 defined by the frame bottom which is utilized to store the socket end of the power strip, the sockets being oriented downwardly so that plug-in of the power cords of the flat panel TV and modular electronic components is facilitated.

FIG. 6 illustrates flat panel TV screen 72 in place on frame 70. For illustration purposes, the receptacle side of power strip 74 is disposed upwardly. The electronic components receptacle 56 is depicted as separated from the frame since it is attached to the frame after the flat panel TV screen is in place. FIG. 6 illustrates the fact that the output wire 78 of modular electronic component 62 is threaded through the electronic component receptacle prior to the component 62 being slid into position in the interior of compartment 68. A primary opening 80 leading to the compartment interior facilitates both installation or removal of component 62. Auxiliary openings are formed at the back of electronic component receptacle 56 to allow the wire 78 to be passed through its associated compartment. Primary and auxiliary openings also communicate with the other compartment interiors of the receptacle 56.

FIG. 7 illustrates attachment of an electronic component receptacle 56 to a frame 52 utilizing the brackets 54 illustrated in FIG. 4. FIG. 8 shows brackets 54 in place on frame 52 with the flat panel TV screen 50 not yet seated in the channels formed by the opposed brackets 54. After such seating has occurred, separate L-shaped brackets 82 attached to the electronic component receptacle 56 are used to secure receptacle 56 to brackets 54. FIG. 10 differs from FIG. 9 in that two electronic component receptacles 56 are employed, rather than one. This increases the capacity of the system insofar as accommodation of modular electronic components is concerned.

FIG. 11 shows a frame 14 accommodating a built-in wireless receiver 90. The receiver is connected by wires to the TV and receives wireless transmissions from a remote transmitter or video sender 92 relaying signals from selected audio/video equipment such as VCR 94, DVD player 96 and satellite or cable receiver 98 or computer (not shown).

The invention claimed is:

1. Apparatus for connection to a flat panel TV screen to improve the appearance thereof and to facilitate operation of audio and video functions related to said flat panel TV screen, said flat panel TV screen having a screen viewing area and a housing surrounding the screen viewing area, said apparatus including a frame having a frame top, a frame bottom and frame sides defining a frame opening larger than the size of the screen viewing area of the flat panel TV screen and a mat having a fixed rectangular configuration releasably attached to said frame extending inwardly from the frame top, frame bottom and frame sides along the entire combined length thereof into the frame opening, said mat being formed of material allowing passage therethrough of wireless control transmissions and having a mat opening smaller than said frame opening, and connector structure for connecting said releasably attached frame and mat to said flat panel TV screen, said mat when said releasably attached frame and mat are connected to said flat panel TV screen by said connector structure being maintained in a fixed position and immovable relative to said frame and viewing area, extending from said frame toward said screen viewing area and completely surrounding said screen viewing area, said mat being sized and configured to allow viewing of said screen viewing area through said frame opening and through said mat opening, said releasably attached frame and mat cooperable to substantially cover said housing and substantially shield said housing from view by a person observing said screen viewing area while allowing control of audio and video functions by wireless control transmissions through said apparatus.

2. The apparatus according to claim 1 wherein said connector structure comprises a plurality of brackets attached to said frame and extending rearwardly from said frame, said brackets defining recesses receiving said housing at spaced locations on said housing.

3. The apparatus according to claim 1 additionally including an electronic component receptacle on said frame and defining a receptacle interior for receiving at least one electronic component operatively associated with said flat panel TV screen operable by wireless control transmissions from a control external of the apparatus, said electronic component receptacle being disposed behind said frame and substantially hidden from view by a person positioned in front of said flat panel TV screen.

4. The apparatus according to claim 3 wherein said electronic component receptacle is divided into a plurality of compartments, each defining a compartment interior, said receptacle interior being at least partially comprised of said compartment interiors, each said compartment interior for receiving a modular electronic component operable by said wireless control transmissions.

5. The apparatus according to claim 3 additionally including receptacle connector structure releasably connecting said electronic component receptacle to said frame.

6. The apparatus according to claim 4 wherein said electronic component receptacle defines a plurality of primary openings communicating with said compartment interiors and facilitating selective installation or removal of said modular electronic components.

7. The apparatus according to claim 6 wherein said electronic component receptacle additionally defines a plurality of auxiliary openings for accommodating wires extending between modular electronic components received by said compartment interiors and said flat panel TV screen.

8. The apparatus according to claim 4 additionally comprising an electrical connector receptacle for receiving a multi-outlet electrical connector employed to provide an electrical connection between said modular electronic components and a source of electricity.

9. The apparatus according to claim 8 wherein said electrical connector receptacle is integral with said frame.

10. The apparatus according to claim 1 additionally comprising mat attachment structure for releasably attaching said mat to said frame whereby said mat may be removed from said frame and replaced by a substitute mat.

11. The apparatus according to claim 10 wherein said mat attachment structure maintains said mat in a substantially planar condition.

12. Apparatus for connection to a flat panel TV screen to improve the appearance thereof and to facilitate operation of audio and video functions related to said flat panel TV screen, said flat panel TV screen having a screen viewing area and a housing surrounding the screen viewing area, said apparatus including a frame having a frame opening larger than the size of the screen viewing area of the flat panel TV screen and a mat releasably attached to said frame extending inwardly from the frame into the frame opening, said mat being formed of material allowing passage therethrough of wireless control transmissions and having a mat opening smaller than said frame opening, and connector structure for connecting said releasably attached frame and mat to said flat panel TV screen, said mat when said releasably attached frame and mat are connected to said flat panel TV screen by said connector structure extending from said frame toward said screen viewing area and surrounding said screen viewing area, said mat being sized and configured to allow viewing of said screen viewing area through said frame opening and through said mat opening, said releasably attached frame and mat cooperable to substantially cover said housing and substantially shield said housing from view by a person observing said screen viewing area while allowing control of audio and video functions by wireless control transmissions, said housing including at least one loudspeaker communicating with said frame opening, and said mat being formed of sound transmissive material and disposed over said at least one loudspeaker and blocking said at least one loudspeaker from view through said frame opening when said releasably attached frame and mat are connected to said flat panel TV screen.

* * * * *